United States Patent
Kamerbeek et al.

(10) Patent No.: US 8,535,743 B2
(45) Date of Patent: Sep. 17, 2013

(54) CAPSULE, SYSTEM AND METHOD FOR PREPARING A PREDETERMINED QUANTITY OF BEVERAGE SUITABLE FOR CONSUMPTION

(75) Inventors: Ralf Kamerbeek, De Meern (NL); John Henri Flamand, Lunteren (NL); Angenita Dorothea Post van Loon, Utrecht (NL); Hendrik Cornelis Koeling, Amersfoort (NL); Arend Cornelis Jacobus Biesheuvel, Werkendam (NL)

(73) Assignee: Koninklijke Douwe Egberts B.V. (NL)

( * ) Notice: Subject to any disclaimer, the term of this patent is extended or adjusted under 35 U.S.C. 154(b) by 0 days.

(21) Appl. No.: 13/316,276

(22) Filed: Dec. 9, 2011

(65) Prior Publication Data
US 2012/0225168 A1    Sep. 6, 2012

Related U.S. Application Data

(63) Continuation of application No. PCT/NL2009/050822, filed on Dec. 30, 2009.

(30) Foreign Application Priority Data

| Jun. 17, 2009 | (EP) | 09162895 |
| Jun. 17, 2009 | (EP) | 09162914 |
| Jun. 17, 2009 | (EP) | 09162931 |
| Jun. 19, 2009 | (EP) | 09163310 |
| Aug. 13, 2009 | (EP) | 09167851 |
| Sep. 17, 2009 | (EP) | 09170590 |

(51) Int. Cl.
B65B 29/02    (2006.01)

(52) U.S. Cl.
USPC ............................... 426/77; 99/295

(58) Field of Classification Search
USPC ................... 99/295, 287; 426/77–84
See application file for complete search history.

(56) References Cited

U.S. PATENT DOCUMENTS 1,576,735 A * 3/1926 Fessenden ............ 426/77
3,615,708 A   10/1971 Abile-Gal
(Continued)

FOREIGN PATENT DOCUMENTS

| CH | 434 609 | 10/1967 |
| DE | 1207 86 6 | 12/1965 |

(Continued)

OTHER PUBLICATIONS

International Search Report for PCT/NL2009/050822, completed Feb. 19, 2010, 5 pages.

*Primary Examiner* — Rena Dye
*Assistant Examiner* — Chaim Smith
(74) *Attorney, Agent, or Firm* — Foley & Lardner LLP

(57) ABSTRACT

A capsule, system and method are usable for preparing a predetermined quantity of beverage using an extractable product. The system includes a capsule comprising a cup having a circumferential wall, a bottom at a first end, and a flange-like rim at a second end. The capsule further includes a lid, in use, connected to the flange-like rim. The wall, bottom and lid, in use, enclose an inner space comprising the extractable product. The cup further includes a plurality of substantially concentric circumferential ridges extending outwardly of the cup, wherein the ridges are made of the same material as the cup. The system further includes a beverage brewing device comprising an enclosing member for enclosing the capsule. In use, at least one of the ridges abuts against at least a portion of the enclosing member, such that a sealing engagement between the capsule and the enclosing member is formed.

52 Claims, 9 Drawing Sheets

(56) References Cited

U.S. PATENT DOCUMENTS

| | | | |
|---|---|---|---|
| 4,321,139 A | 3/1982 | Auclair | |
| 4,417,504 A | 11/1983 | Yamamoto | |
| 4,471,689 A * | 9/1984 | Piana | 99/295 |
| 4,775,048 A | 10/1988 | Baecchi et al. | |
| 4,859,337 A | 8/1989 | Woltermann | |
| 5,325,765 A | 7/1994 | Sylvan et al. | |
| 5,840,189 A | 11/1998 | Sylvan et al. | |
| D408,679 S | 4/1999 | Potts et al. | |
| 6,079,315 A | 6/2000 | Beaulieu et al. | |
| 6,082,247 A | 7/2000 | Beaulicu | |
| 6,142,063 A | 11/2000 | Beaulieu et al. | |
| 6,182,554 B1 | 2/2001 | Beaulieu et al. | |
| D452,433 S | 12/2001 | Lazaris | |
| D452,434 S | 12/2001 | Sweeney | |
| 6,440,256 B1 | 8/2002 | Gordon et al. | |
| D462,865 S | 9/2002 | Honan et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,644,173 B2 | 11/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| D489,215 S | 5/2004 | Honan et al. | |
| D502,362 S | 3/2005 | Lazaris et al. | |
| D513,572 S | 1/2006 | Schaffeld et al. | |
| 7,165,488 B2 | 1/2007 | Bragg et al. | |
| D544,299 S | 6/2007 | Schaffeld et al. | |
| D554,299 S | 10/2007 | Ragonetti et al. | |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,398,726 B2 | 7/2008 | Streeter et al. | |
| 7,513,192 B2 | 4/2009 | Sullivan et al. | |
| 7,523,695 B2 | 4/2009 | Streeter et al. | |
| 7,543,527 B2 | 6/2009 | Schmed | |
| 7,552,672 B2 | 6/2009 | Schmed | |
| 7,640,845 B2 | 1/2010 | Woodnorth et al. | |
| 7,856,920 B2 | 12/2010 | Schmed et al. | |
| 2004/0045443 A1 | 3/2004 | Lazaris et al. | |
| 2005/0016383 A1* | 1/2005 | Kirschner et al. | 99/279 |
| 2005/0051478 A1 | 3/2005 | Karanikos et al. | |
| 2005/0205601 A1 | 9/2005 | Taylor | |
| 2005/0287251 A1 | 12/2005 | Lazaris et al. | |
| 2006/0110507 A1* | 5/2006 | Yoakim et al. | 426/433 |
| 2006/0174773 A1 | 8/2006 | Taylor | |
| 2006/0292012 A1 | 12/2006 | Brudevold et al. | |
| 2007/0202237 A1* | 8/2007 | Yoakim et al. | 426/590 |
| 2008/0095904 A1 | 4/2008 | Sullivan et al. | |
| 2008/0115674 A1 | 5/2008 | Huang et al. | |
| 2008/0134902 A1 | 6/2008 | Zimmerman et al. | |
| 2010/0024658 A1 | 2/2010 | Jacobs et al. | |
| 2010/0303964 A1 | 12/2010 | Beaulieu et al. | |

FOREIGN PATENT DOCUMENTS

| | | |
|---|---|---|
| DE | 7612 16 9 | 1/1977 |
| DE | 60114 05 0 | 7/2006 |
| EP | 1 203 554 | 5/2002 |
| EP | 1 849 715 | 10/2007 |
| EP | 2 070 828 | 10/2007 |
| FR | 2 213 757 | 8/1974 |
| FR | 2 617 389 | 1/1989 |
| WO | WO-2006/137737 | 12/2006 |
| WO | WO-2007/137974 | 12/2007 |
| WO | WO-2008/078990 | 7/2008 |
| WO | WO-2010/084475 | 7/2010 |

* cited by examiner

CAPSULE, SYSTEM AND METHOD FOR PREPARING A PREDETERMINED QUANTITY OF BEVERAGE SUITABLE FOR CONSUMPTION

CROSS-REFERENCE TO RELATED PATENT APPLICATIONS

The present application is a continuation of International Application No. PCT/NL2009/050822, filed on Dec. 30, 2009, which claims priority to European Patent Application Nos. EP09162895.8, filed Jun. 17, 2009; EP09162914.7, filed Jun. 17, 2009; EP09162931.1, filed Jun. 17, 2009; EP09163310.7, filed Jun. 19, 2009; EP09167851.6, filed Aug. 13, 2009; and EP09170590.5, filed Sep. 17, 2009, all of which are incorporated herein by reference.

BACKGROUND

The invention relates to a capsule, system and method for preparing a predetermined quantity of beverage suitable for consumption using an extractable product.

Systems for preparing a beverage, such as coffee, using a brewing device for supplying a liquid, such as water, under pressure to a capsule comprising a dose of a beverage ingredient are known. Commonly, the brewing device comprises an enclosing member for enclosing the capsule. In use a sealing engagement is provided between the capsule and the enclosing member, so as to prevent leaking of a liquid, e.g. water or the beverage. The sealing engagement is usually obtained by pressing the capsule and the enclosing member against each other along a circumferential line of contact.

It is possible that the material of the enclosing member at the location of the sealing engagement, e.g. an elastomeric material, is softer than the material of the capsule at the location of the sealing engagement, e.g. aluminium. Such system is for instance known from EP 1 203 554. In such case the material of the enclosing member at the location of the sealing engagement may be compressed. Such systems may have the disadvantage that the material of the enclosing member at the location of the sealing engagement can subject to wear, degradation and/or fouling, so that the quality of the sealing engagement may deteriorate if the age of the brewing device increases.

This disadvantage seems to be, at least partially, overcome by other known systems, wherein the material of the enclosing member at the location of the sealing engagement, e.g. a metal, is harder than the material of the capsule at the location of the sealing engagement, e.g. a plastics material. Such system is for instance known from FR 2 617 389. In such case the material of the capsule at the location of the sealing engagement may be compressed. Such systems have the advantage that the material of the enclosing member at the location of the sealing engagement may be less subject to wear, degradation and/or fouling, while good sealing engagement may be obtained. Especially when the material of the capsule at the location of the sealing engagement is the same material as the material of the circumferential wall, the capsule may be manufactured with great ease. This may, however, provide the disadvantage that such sealing engagement may be upset if the enclosing member, at the location of the sealing engagement, possesses irregularities, such as scratches, crevices, caked-on foul, protrusions or the like.

SUMMARY

It is an object of the invention to at least partially meet the above disadvantage.

According to one embodiment a capsule is provided for preparing a predetermined quantity of beverage suitable for consumption using an extractable product, comprising a cup comprising a circumferential wall, a bottom closing the circumferential wall at a first end, and a flange-like rim extending outwardly of the circumferential wall at a second end opposite the bottom, and a lid in use connected to the flange-like rim, wherein the wall, bottom and lid, in use, enclose an inner space comprising the extractable product, and wherein the cup further comprises a plurality of substantially concentric circumferential ridges extending outwardly of the cup, wherein the ridges are made of the same material as the cup.

In use, at least one of the circumferential ridges may abut against at least a portion of the enclosing member, such that the sealing engagement is formed between, e.g. the top of, at least one of the ridges and the at least one portion of the enclosing member. Since the plurality of ridges is provided, a misalignment between the capsule and the enclosing member may be allowed while still obtaining the sealing engagement.

Preferably, the ridges are arranged on the flange-like rim, e.g. on the side of the flange-like rim facing away from the lid. Hence, the ridges may abut against a leading edge of the enclosing member. Thus, the sealing engagement may be formed at the location of the flange-like rim.

It is possible that the ridges are integral with the flange-like rim. The ensemble of the ridges and the cup may be a unitary piece. Thus manufacture of the cup may include manufacture of the ridges, e.g. by injection moulding the ensemble of the cup and the ridges. Hence, easy manufacture of the cup of the capsule may be obtained.

In one embodiment, each ridge of the plurality of ridges has substantially the same height prior to use. Hence, each of the ridges of the plurality of ridges may contribute to the sealing engagement between the capsule and the enclosing member. Optionally, each ridge of the plurality of ridges has substantially the same width. It is not excluded, however, that the ridges have mutually different heights and/or widths.

It is possible that a width of a ridge, of the plurality of ridges is smaller than a height of that ridge. Preferably this applies to each ridge of the plurality of ridges. Hence the ridge has a slender form, allowing easy deformation of the ridge, e.g. by compression of a top edge of the ridge towards a base of the ridge. Hence, the ridge may easily follow an irregularity of the enclosing member at the location of the sealing engagement, e.g. a dent and/or a protrusion at the leading edge of the enclosing member.

Preferably, a ridge of the plurality of the ridges has a width that is equal to or less than a thickness of the flange-like rim. Preferably, a ridge of the plurality of ridges has a height that is equal to or less than a thickness of the flange-like rim. Preferably, a ridge of the plurality of ridges has a height that is equal to or less than a minimum thickness of the flange-like rim at the location where the ridges are present. Preferably this applies to each ridge of the plurality of ridges. Hence, a resistance of the ridge against compression may be less than a resistance against compression of the rim. Thus, the rim may be rigid relative to the ridge, while the ridge may possess enough compressibility due to its shape and/or dimensions to provide the sealing engagement with the enclosing member even if the enclosing member comprises an irregularity at the location of the sealing engagement.

It is possible that a ridge of the plurality of ridges has a height of less than 0.4 mm, preferably less than 0.3 mm, more preferably less than 0.21 mm, even more preferably less than 0.15 mm. It is also possible that a ridge of the plurality of ridges has a maximum width of less than 0.3 mm, preferably less than 0.21 mm, more preferably less than 0.15 mm. Preferably this applies to each ridge of the plurality of ridges. These dimensions have been found to provide good sealing engagement between the ridge and the enclosing member.

In an embodiment, a ridge of the plurality of ridges has a tapered, e.g. a substantially triangular, cross section. Preferably this applies to each ridge of the plurality of ridges. This provides the advantage that compression of the ridge requires a progressively increasing force. Hence, the ridge can easily follow the contour of an irregularity of the enclosing member since this will exert a locally increased force on the ridge. Other cross sections, such as a semicircular cross section or a beam-shaped cross section, possibly with rounded corners, are conceivable too.

Preferably all ridges of the plurality of ridges have the same cross sectional shape.

In an embodiment, a (mutual) radial distance between two neighbouring ridges is less than a maximum width of the ridges, preferably less than 50% of the maximum width, more preferably less than 25% of the maximum width. Thus, the ridges are spaced closely together, allowing a good chance that at least one of the ridges properly abuts against the enclosing member, while still allowing ample space for the ridges to widen due to compression. Also, the closely spaced ridges allow for increased tolerance to misalignment of the capsule with respect to the enclosing member, since the narrow space between the ridges may form a labyrinth providing sufficient resistance against fluid flow to provide a sufficient sealing engagement between the capsule and the enclosing member, even if not one single ridge fully abuts against the enclosing member.

Preferably, the lid is connected to the flange-like rim and the inner space is at least partially filled with the extractable product. Hence, the capsule ready for use is provided. The capsule may be hermetically closed, e.g. so as to improve shelf life of the capsule. The hermetically closed capsule holds the extractable product out of contact with the environment of the capsule, as opposed to an open capsule in which the extractable product is in contact with the environment.

Alternatively, the lid and/or bottom is porous and/or comprises openings for allowing a liquid to enter and/or exit the inner space.

In an embodiment, the capsule is disposable. The disposable capsule is designed and intended to be disposed after single use. Thus, problems associated with hygiene, e.g. microbial growth, may be minimised. The capsule may also be biodegradable to minimise environmental load.

Preferably, the capsule is designed for preparing a single serving of the beverage.

The invention also relates to a system for preparing a predetermined quantity of beverage suitable for consumption using an extractable product, comprising i) a capsule comprising a cup comprising a circumferential wall, a bottom closing the circumferential wall at a first end, and a flange-like rim extending outwardly of the circumferential wall at a second end opposite the bottom, and a lid connected to the flange-like rim, wherein the wall, bottom and lid enclose an inner space comprising the extractable product, and wherein the cup further comprises a plurality of substantially concentric circumferential ridges extending outwardly of the cup, wherein the ridges are made of the same material as the cup; and ii) a beverage brewing device comprising an enclosing member for enclosing the capsule, wherein, in use, at least one of the ridges abuts against at least a portion of the enclosing member, such that a sealing engagement between the capsule and the enclosing member is formed.

In an embodiment at least a portion of a leading edge of the enclosing member is arranged to abut against at least one of the ridges. Herein the ridges may be arranged on the flange-like rim of the capsule.

Preferably, the ridges each have an individual width that is less than the width of the leading edge of the enclosing member. This provides the advantage that the ridges are narrow relative to the leading edge of the enclosing member. Thus, the ridges may easily adapt to a, e.g. small, irregularity, such as a dent, scratch, crevice and/or protrusion, on the leading edge of the enclosing member.

Preferably, the plurality of ridges has a combined width that is larger than the width of the leading edge of the enclosing member. Hence, considerable tolerance for misalignment of the capsule with respect to the leading edge of the enclosing member is provided.

It is possible that a ridge of the plurality of ridges has a height that is less than the width of the leading edge of the enclosing member. Preferably this applies to each ridge of the plurality of ridges. Thus, the ridge has a small height relative to the width of the leading edge of the enclosing member. This may prevent buckling of the ridges so that good sealing engagement between the leading edge of the enclosing member and the ridges may be obtained.

The invention also relates to a method for preparing a predetermined quantity of beverage suitable for consumption using a system according to the invention.

BRIEF DESCRIPTION OF THE DRAWINGS

The invention will now be further elucidated by means of, non-limiting, examples referring to the drawing, in which.

In the Figures and the following description, like reference numerals refer to like features.

DETAILED DESCRIPTION OF EXEMPLARY EMBODIMENTS

Figure 1:
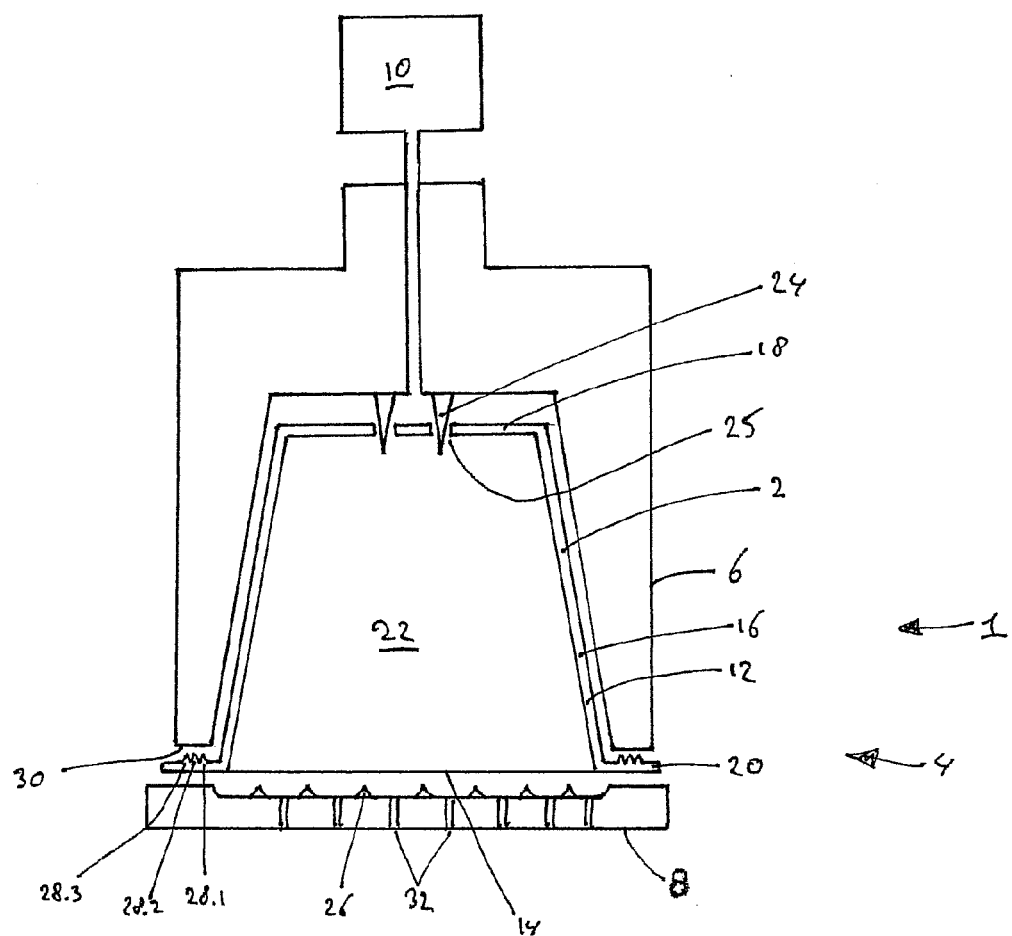
FIG. 1 shows a schematic representation of a first example of a system according to the invention.

FIG. 1 shows a schematic representation, in cross sectional view, of a first example of a system 1 for preparing a predetermined quantity of beverage suitable for consumption using an extractable product. The system 1 comprises an exchangeable capsule 2, and a beverage brewing device 4. The device 4 comprises enclosing member 6 for holding the exchangeable capsule 2. In this example, the device 4 further comprises a support member 8 for supporting the capsule 2.

In FIG. 1 a gap is drawn between the capsule 2, the enclosing member 6 and the support member 8 for clarity. It will be appreciated that, in use, the capsule 2 may lie in contact with the enclosing member 6 and the support member 8. Commonly, the enclosing member 6 has a shape complementary to the shape of the capsule 2. The apparatus 4 further comprises a fluid dispensing device 10 for supplying an amount of a fluid, such as water, under a pressure, of e.g. 9 bars, to the exchangeable capsule 2.

In the example shown in FIG. 1, the exchangeable capsule 2 comprises a cup 12 and a lid 14. In this example, the cup 12 comprises a circumferential wall 16, a bottom 18 closing the circumferential wall 16 at a first end, and a flange-like rim 20 extending outwardly of the circumferential wall 16 at a second end opposite the bottom 18 wall. The circumferential wall 16, the bottom 18 and the lid 14 enclose an inner space 22 comprising the extractable product. In this example, the capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises lid piercing means 26, here embodied as protrusions of the support member 8, for piercing the lid 14 of the capsule 2. The lid piercing means 26 may be arranged to tear the lid 14 once a (fluid) pressure inside the inner space 22 exceeds a threshold pressure and presses the lid 14 against the lid piercing means 26 with sufficient force. The lid 14 may e.g. comprise a tearable foil, e.g. made of aluminium.

In this example, the cup 12 further comprises a plurality of substantially concentric circumferential ridges 28.i (i=1, 2, 3). In this example, the ridges 28.i are arranged on the flange-like rim 20. Here the ridges 28.i are arranged on the side of the flange-like rim 20 facing away from the lid 14. More generally put, the ridges 28.i extend outwardly of the cup 12. In this example the ridges 28.i are made of the same material as the cup 12. In this example, the ridges 28.i are integral with the cup 12. It will be appreciated that in this example, the circumferential ridges at least partially circumscribe the inner space 22 of the capsule 2.

As can be seen from FIG. 1, in use the ridges 28.i may abut against a leading edge 30 of the enclosing member 6. When in this example at least one ridge 28.i abuts against at least a portion of the leading edge 30 of the enclosing member 6, a sealing engagement is obtained between the enclosing member 6 and the capsule 2 at the location where the at least one ridge 28.i abuts against at least the portion of the leading edge 30 of the enclosing member 6.

The system 1 shown in FIG. 1 is operated as follows for preparing a cup of coffee, wherein the extractable product is roasted and ground coffee.

The capsule 2 is placed in the enclosing member 6. The support member 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the lid 14 to deform and be pressed against the lid piercing means 26. Once the pressure reaches a certain level, the tear strength of the lid 14 will be surpassed and the lid will rupture against the lid piercing means 26, creating exit openings. The prepared coffee will drain from the capsule 2 through the exit openings and outlets 32 of the support member 8, and may be supplied to a container such as a cup (not shown).

Figure 2:
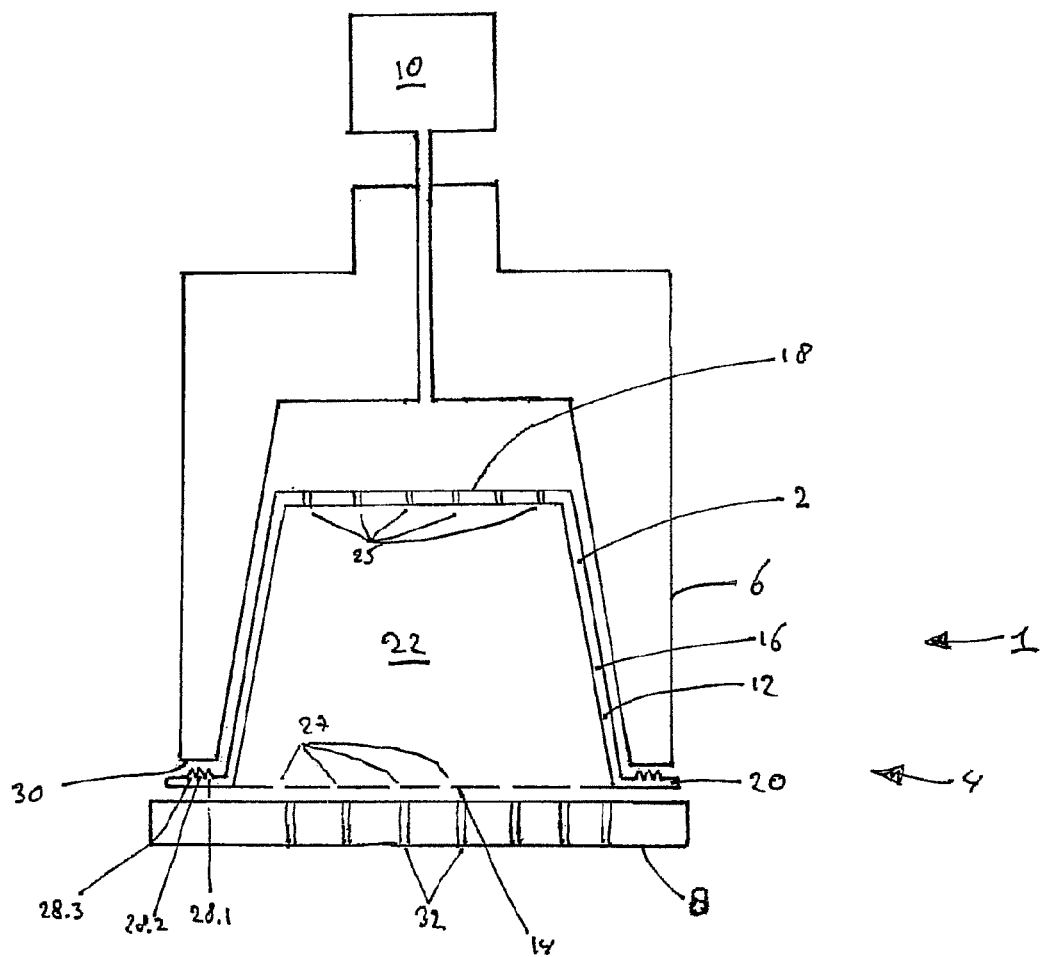
FIG. 2 shows a schematic representation of a second example of a system according to the invention.

FIG. 2 shows a schematic representation, in cross sectional view, of a second example of a system 1 for preparing a predetermined quantity of beverage suitable for consumption using an extractable product. The system 1 comprises an exchangeable capsule 2, and a beverage brewing device 4. The device 4 comprises enclosing member 6 for holding the exchangeable capsule 2. In this example, the device 4 further comprises a support member 8 for supporting the capsule 2.

In FIG. 2 a gap is drawn between the capsule 2, the enclosing member 6 and the support member 8 for clarity. It will be appreciated that, in use, the capsule 2 may lie in contact with the enclosing member 6 and the support member 8. Commonly, the enclosing member 6 has a shape complementary to the shape of the capsule 2. The apparatus 4 further comprises a fluid dispensing device 10 for supplying an amount of a fluid, such as water, under a pressure, of e.g. 9 bars, to the exchangeable capsule 2.

In the example shown in FIG. 2, the exchangeable capsule 2 comprises a cup 12 and a lid 14. In this example, the cup 12 comprises a circumferential wall 16, a bottom 18 closing the circumferential wall 16 at a first end, and a flange-like rim 20 extending outwardly of the circumferential wall 16 at a second end opposite the bottom 18 wall. The circumferential wall 16, the bottom 18 and the lid 14 enclose an inner space 22 comprising the extractable product. In this example, the capsule is initially open. Hence, the capsule 2 comprises premade entrance openings 25. The entrance openings 25 may be through holes in the bottom 18. Further, the capsule 2 comprises premade exit openings 27. The exit holes 27 may be through holes in a foil-like lid 14, e.g. manufactured from plastics material, or may be pores in a porous lid, e.g. manufactured from a non-woven material such as filter paper.

The system 1 of FIG. 2 does not comprise bottom piercing means nor lid piercing means 26.

In this example, the cup 12 further comprises a plurality of substantially concentric circumferential ridges 28.i (i=1, 2, 3, . . . ). In this example, the ridges 28.i are arranged on the flange-like rim 20. Here the ridges 28.i are arranged on the side of the flange-like rim 20 facing away from the lid 14. More generally put, the ridges 28.i extend outwardly of the cup 12. In this example the ridges 28.i are made of the same material as the cup 12. In this example, the ridges 28.i are integral with the cup 12.

As can be seen from FIG. 2, in use the ridges 28.i may abut against a leading edge 30 of the enclosing member 6. When in this example at least one ridge 28.i abuts against at least apportion of the leading edge 30 of the enclosing member 6, a sealing engagement is obtained between the enclosing member 6 and the capsule 2 at the location where the at least one ridge 28.i abuts against at least the portion of the leading edge 30 of the enclosing member 6.

The system 1 shown in FIG. 2 is operated as follows for preparing a cup of coffee, wherein the extractable product is roasted and ground coffee.

The capsule 2 is placed in the enclosing member 6. The support member 8 is brought into contact with the capsule 2. The fluid, here hot water under pressure, is supplied to the extractable product in the inner space 22 through the entrance opening 25. The water will wet the coffee grounds and extract the desired substances to form the coffee beverage.

During supplying the water under pressure to the inner space 22, the pressure inside the capsule 2 may rise. The prepared coffee will drain from the capsule 2 through the exit openings 27 and outlets 32 of the support member 8, and may be supplied to a container such as a cup (not shown).

Figure 3A:
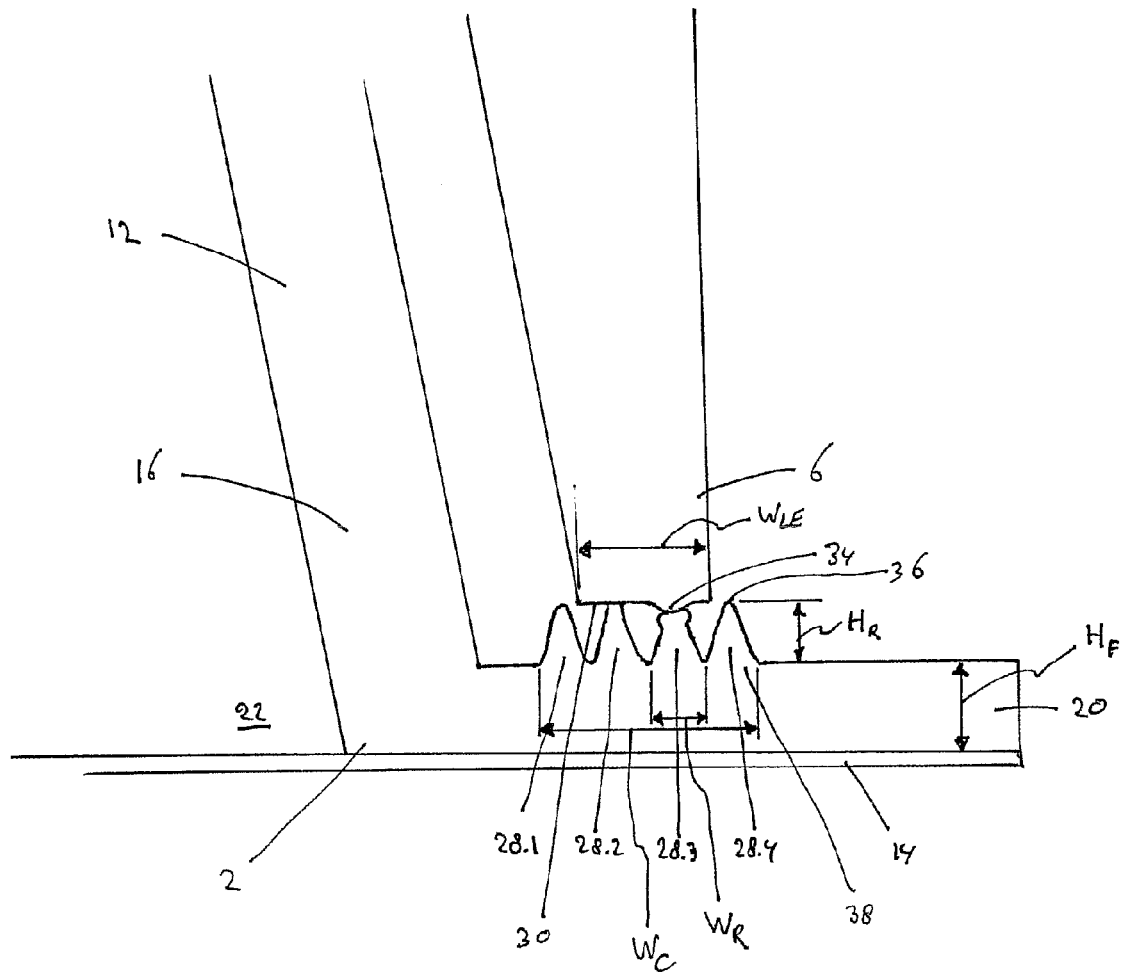
FIG. 3A shows an enlarged detail of a part of the system according to the invention.
Figure 3B:
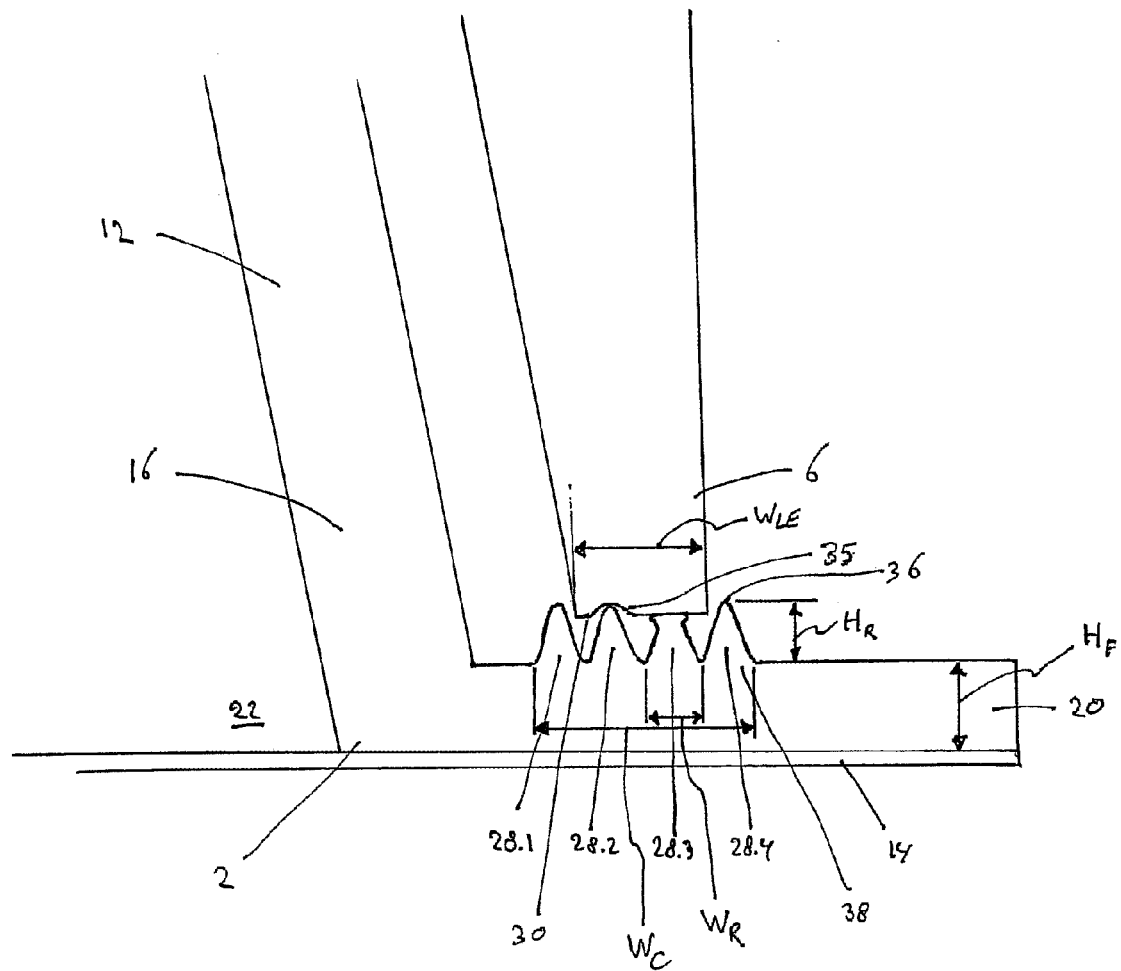
FIG. 3B shows an enlarged detail of a part of the system according to the invention.

FIGS. 3a and 3b show an enlarged detail of a part of the system 1 according to the invention. In this example four circumferential ridges 28.i are arranged on the flange-like rim 20. Here, the ridges 28.i are integral with the rim 20. In this example the ridges 28.i are arranged concentrically with respect to each other. In this example the ridges 28.i are also arranged concentrically with an axis of the cup 12. It will be appreciated that the ridges 28.i need not be exactly concentric as long as in use, at least one of the ridges 28.i abuts against at least a portion of the enclosing member 6, such that the sealing engagement is formed between, e.g. the top of, at least one of the ridges and the at least one portion of the enclosing member. Since the plurality of ridges is provided, a misalignment between the capsule and the enclosing member may be allowed while still obtaining the sealing engagement.

In FIG. 3a the leading edge 30 of the enclosing member 6 comprises an irregularity in the form of a protrusion 34, e.g. a bulge, a burr or a lump (e.g. caked-on debris). It can be seen that in this example one particular ridge 28.3 of the ridges 28.i abuts the protrusion 34 and is locally more compressed. Hence, the ridges 28.i and the enclosing member 6 are in sealing engagement despite the presence of the protrusion 34.

In FIG. 3b the leading edge 30 of the enclosing member 6 comprises an irregularity in the form of a recess 35, e.g. a dent, scratch or a crevice. It can be seen that in this example one particular ridge 28.2 of the ridges 28.i faces the recess 35. A neighbouring ridge 28.3 will, accordingly be locally more compressed and abut the leading edge 30 of the enclosing member 6. Hence, the ridges 28.i and the enclosing member 6 are in sealing engagement despite the presence of the recess 35.

In the examples of FIGS. 3a and 3b, each of the ridges 28.i has a substantially triangular cross section. This provides the advantage that compression of the ridges 28.i requires a progressively increasing force. Hence, each ridge 28.i can easily follow the contour of the irregularity of the enclosing member 6.

In the examples of FIGS. 3a and 3b, all ridges have substantially the same height $H_R$ prior to use, e.g. prior to being compressed. Hence, all ridges 28.i may equally contribute to the sealing engagement between the capsule 2 and the enclosing member 6. Hence, a misalignment between the capsule 2 and the enclosing member 6 may be tolerated, without the leading edge 30 failing to abut any ridge 28.i.

In the examples of FIGS. 3a and 3b the ridges 28.i each have a maximum individual width $W_R$ that is less than the width $W_{LE}$ of the leading edge 30 of the enclosing member 6. Thus, each ridge 28.i is narrow relative to the leading edge 30, so that each ridge 28.i can easily be compressed by the leading edge 30. Further, here the plurality of ridges 28.i has a combined width $W_C$ that is larger than the width $W_{LE}$ of the leading edge 30 of the enclosing member 6. Hence, a misalignment between the capsule 2 and the enclosing member 6 may be tolerated, without the leading edge 30 failing to abut any ridge 28.i.

In these examples, the width $W_R$ of each of the ridges 28.i is smaller than the height $H_R$ of that ridge prior to use. Hence the ridges 28.i have a slender form, allowing easy deformation of the ridges 28.i, e.g. by compression of a top edge 36 of the ridges towards a base 38 of the ridges 28.i. Hence, the ridges 28.i may easily follow the irregularity in the enclosing member 6 at the location of the sealing engagement. It is noted that herein the width $W_R$ of the ridge is measured parallel to the plane onto which the ridge is arranged and that the height $H_R$ of the ridge is measured orthogonal to the width.

In these examples, the width $W_R$ each of the ridges 28.i is less than a thickness $H_F$ of the flange-like rim 20. In these examples, the width $W_R$ each of the ridges 28.i is less than a minimum thickness $H_F$ of the flange-like rim 20 at the location where the ridges are present. Also in these examples, the height $H_R$ of each of the ridges 28.i prior to use is less than the thickness $H_F$ of the flange-like rim 20. Hence, a resistance against compression of the ridges 28.i may be less than a resistance against compression of the rim 20. In these examples the rim 20 will be rigid relative to the ridges 28.i, while the ridges 28.i may possess enough compressibility due to their shape and dimensions to provide the sealing engagement with the enclosing member 6 even if the enclosing member comprises the irregularity at the location of the sealing engagement. It will be appreciated that the ratio of the resistance against compression of the ridges 28.i to the resistance against compression of the rim 20 may be further improved by increasing the thickness of the rim 20 at least locally at the position of the ridges 28.i.

The geometry of the ridges 28.i allows the ridges 28.i to adapt to an irregularity at the enclosing member 6, even if a material is chosen which allows the remainder of the cup 12 to be substantially rigid. Such substantially rigid cup 12 may increase the ease of handling of the capsule 2. It is for instance possible that the ridges 28.i are unitary with the flange-like rim 20, circumferential wall 16, and optionally the bottom 18, e.g. of a plastics material. It has been found that in such case the cup 12 may be substantially rigid, while the ridges 28.i may cooperate with the enclosing member 6 to provide the sealing engagement even if the chosen plastics material has a shore D hardness of 70 or more.

In these examples, the thickness of the rim 20 is approximately 0.2 mm. In these examples, the width of the leading edge 30 of the enclosing member 6 is approximately 0.7 mm. In these examples the height $H_R$ of each of the ridges 28.i is approximately 0.2 mm prior to use. Preferably the height $H_R$ is less than 0.3 mm, more preferably less than 0.21 mm, it is also possible that the height $H_R$ is less than 0.15 mm prior to use. In these examples the maximum width $W_R$ of each of the ridges 28.i is approximately 0.14 mm. Preferably, the width $W_R$ is less than 0.3 mm, more preferably less than 0.21 mm, most preferably less than 0.15 mm. These dimensions have been found to provide good sealing engagement between the ridges 28.i and the enclosing member 6.

In the examples of FIGS. 3a and 3b the ridges 28.i are spaced radially such that two neighbouring ridges substantially abut radially. More in general, the radial distance between two neighbouring ridges 28.i is preferably less than the maximum width $W_R$ of the ridges 28.i, more preferably less than 50% of the maximum width $W_R$, most preferably less than 25% of the maximum width $W_R$. Thus, the ridges 28.i are spaced closely together, allowing a good chance that at least one of the ridges 28.i properly abuts against the leading edge 30 of the enclosing member 6. Also, the closely spaced ridges 28.i allow for increased tolerance to misalignment of the capsule 2 with respect to the enclosing member 6, since the narrow space between the ridges 28.i may form a labyrinth providing sufficient resistance against fluid flow to provide a sufficient sealing engagement, even if not one single ridge 28.i fully abuts against the enclosing member 6.

In a preferred embodiment according to FIG. 3a or FIG. 3b, the ridges 28.i are integrally formed with the cup 12. The ensemble of the cup 12 and ridges 28.i may e.g. be injection moulded in one piece. The ensemble may be formed from a plastics material, such as for instance polypropylene.

In a preferred embodiment the material of the ridges 28.i is chosen to be plastically deformable. Preferably, the ridges 28.i, at least the tops 36 of the ridges may be plastically deformed upon contact with the enclosing member 6. The plastically deforming ridges 28.i may easily adapt to an irregularity of the enclosing member 6 at the location of the sealing engagement.

It will be appreciated that the details of FIGS. 3a and 3b may be applied to the system described in view of FIG. 1 as well as to the system described in view of FIG. 2.

Figure 4:
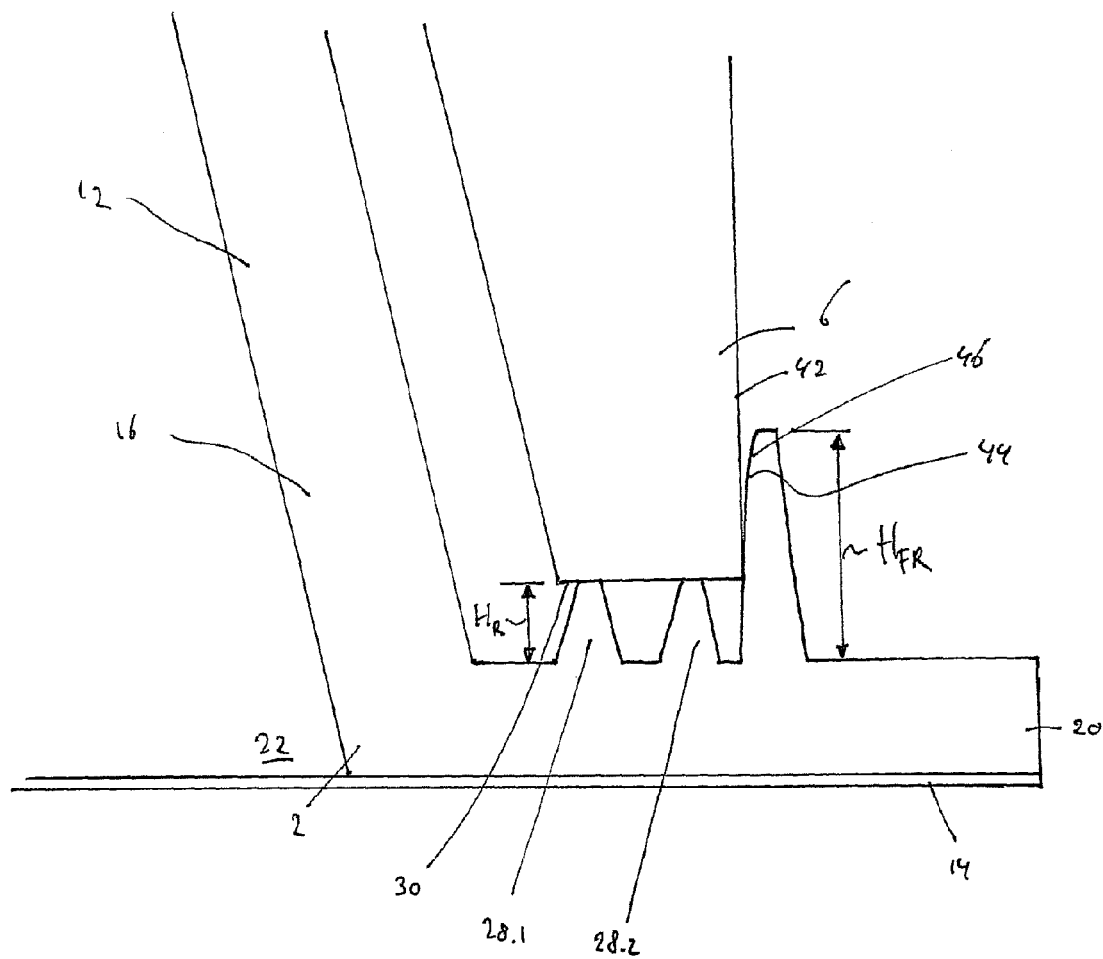
FIG. 4 shows an enlarged detail of a part of the system according to the invention.

FIG. 4 shows an enlarged detail of a part of an elaborate system 1 according to the invention. In this example, in addition to the plurality of ridges 28.i, the capsule 2 comprises a further ridge 40.

In FIG. 4 the further ridge 40 is arranged on the flange-like rim 20, on the side facing away from the lid 14. Here, the further ridge 40 is integral with the flange-like rim 20. In this example, the further ridge 40 is substantially concentric with the ridges 28.i. Here the further ridge 40 is positioned circumscribing the ridges 28.i. It will be noted that a height $H_{FR}$ of the further ridge 40 is different from the height $H_R$ of the ridges 28.i. In this example, the height $H_{FR}$ of the further ridge 40 is larger than the height $H_R$ of the ridges 28.i.

In this example, the further ridge 40 is arranged to abut against an outer circumferential surface 42 of the enclosing member 6. The outer circumferential surface 42 may be wedged against the inner circumferential surface 44 of the further ridge 40. In order to facilitate insertion of the enclosing member 6 within the perimeter of the further ridge 40, the further ridge 40 may comprise a conical section 46 on the inner circumferential surface 44.

Thus, in this example at least one of the ridges 28.i abuts against the enclosing member 6, and additionally, the further ridge 40 abuts against the enclosing member 6. Hence, an improved sealing engagement between the capsule 2 and the enclosing member 6 may be obtained.

It will be appreciated that the further ridge 40 may also be applied in the situations described with respect to FIGS. 1, 2, 3a and 3b.

Figure 5A:
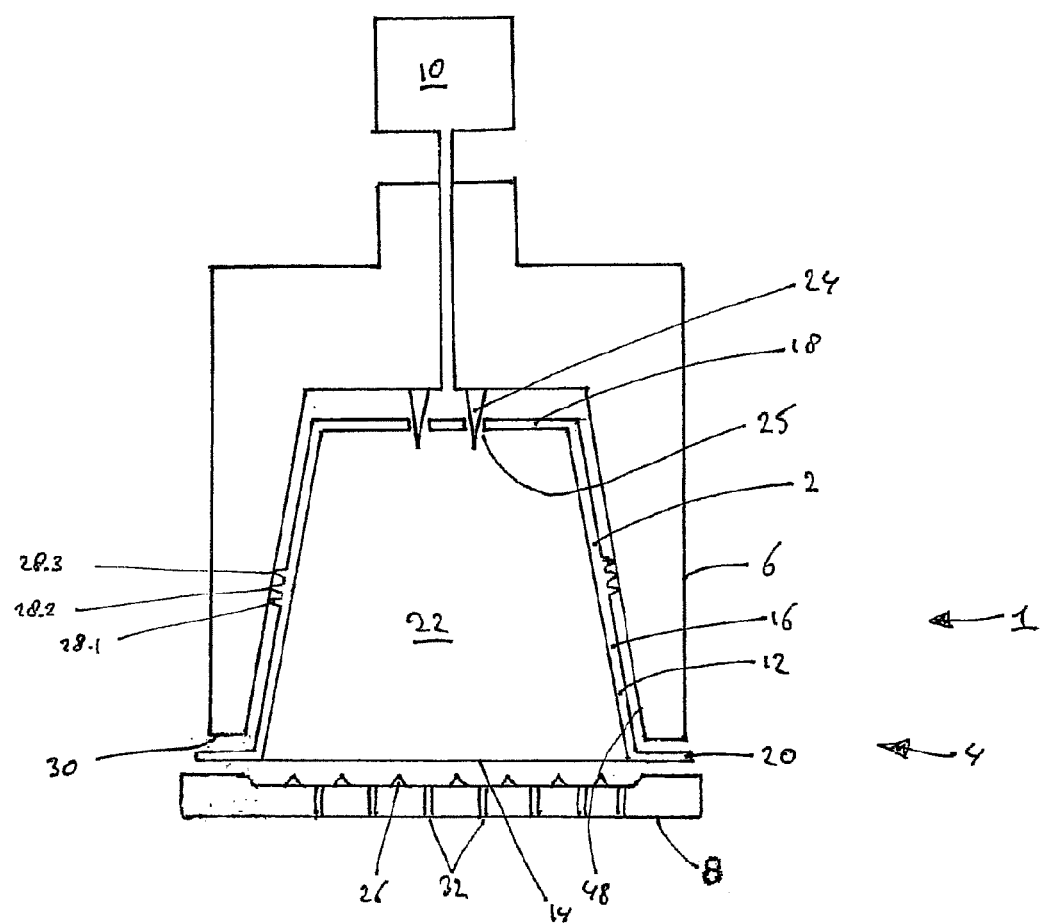
FIG. 5A shows a schematic representation of a further example of a system according to the invention.

FIG. 5a shows a schematic representation of a further example of a system 1 according to the invention. The system 1 shown in FIG. 5a is substantially identical to the system shown in FIG. 1. In FIG. 5a, however, the location of the ridges 28.i on the cup 12 is different. In this example, the ridges 28.i are located on the circumferential side wall 16 of the cup 12. Here, the ridges 28.i abut against an inner circumferential surface 48 of the enclosing member 6. In FIG. 5a the ridges 28.i and the inner circumferential surface 48 are in sealing engagement. It will be appreciated that also in the system shown in FIG. 2 the ridges 28.i may be located on the circumferential side wall 16 of the cup 12.

Figure 5B:
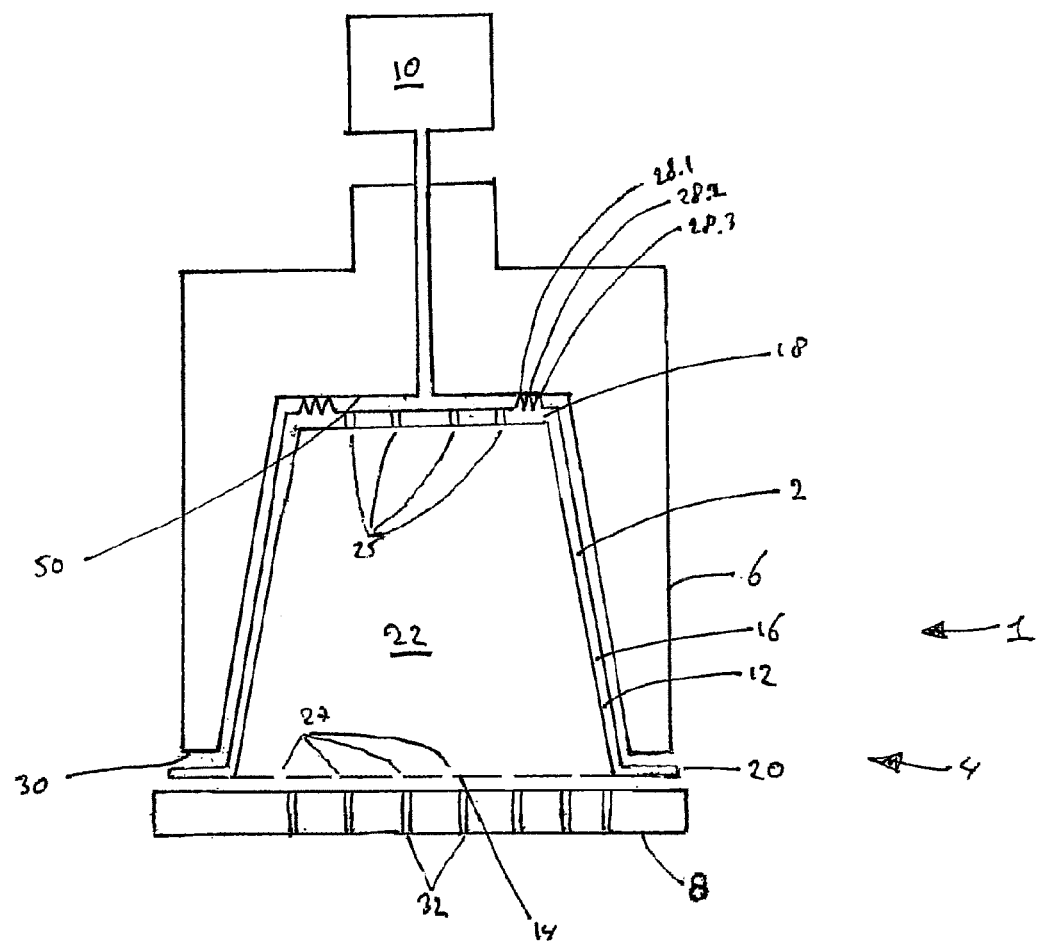
FIG. 5B shows a schematic representation of further example of a system according to the invention.

FIG. 5b shows a schematic representation of a further example of a system 1 according to the invention. The system 1 shown in FIG. 5b is substantially identical to the system shown in FIG. 2. In FIG. 5b, however, the location of the ridges 28.i on the cup 12 is different. In this example, the ridges 28.i are located on the outer surface of the bottom 18 of the cup 12. Here, the ridges 28.i abut against an inner back surface 50 of the enclosing member 6. In FIG. 5b the ridges 28.i and the inner back surface 50 are in sealing engagement. It will be appreciated that also in the system shown in FIG. 1 the ridges 28.i may be located on the outer surface of the bottom 18 of the cup 12.

Figure 6A:
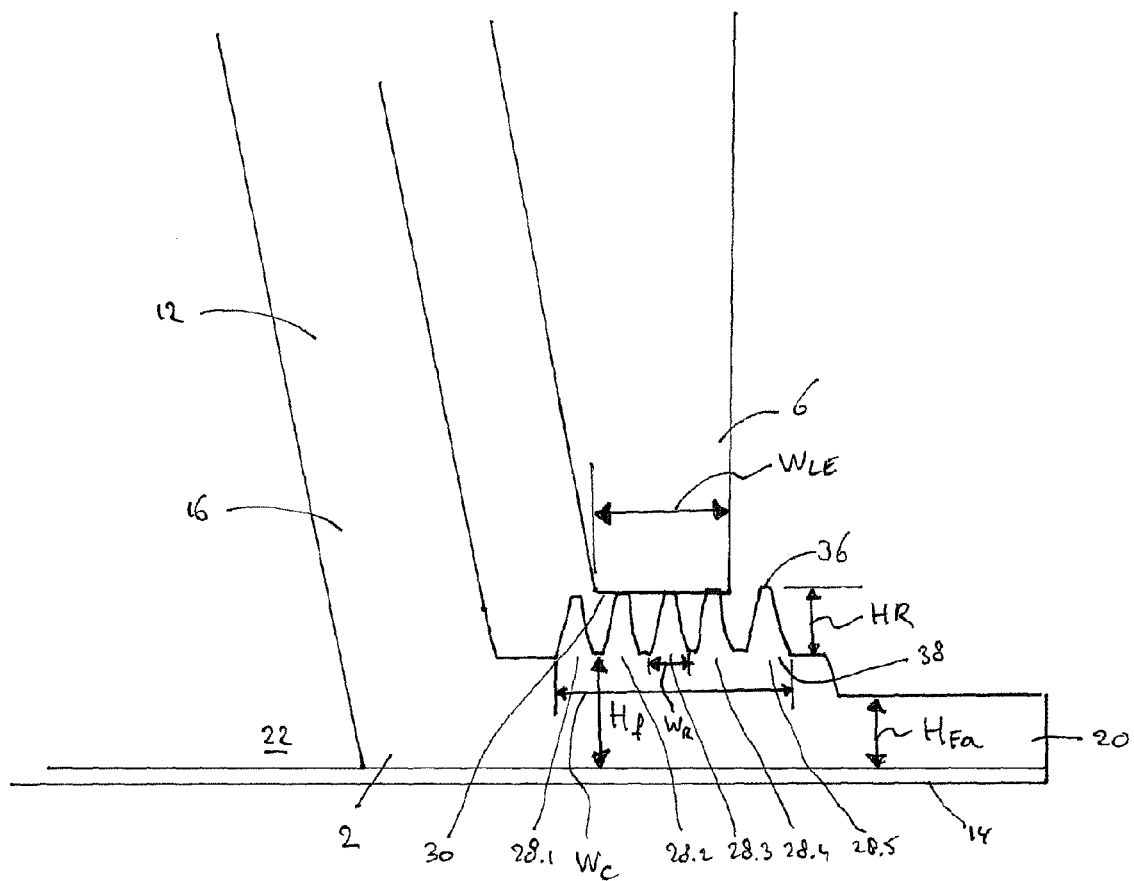
FIG. 6A shows a schematic representation of a further example of a system according to the invention.

FIG. 6a shows a schematic representation of a further example of a system 1 according to the invention. The system 1 shown in FIG. 6a is substantially identical to the system shown in FIG. 3a and FIG. 3b. In FIG. 6a, however, the flange-like rim comprises a thickened portion at the location where the ridges 28.i are present. That is a thickness $H_F$ of the flange-like rim is greater at the location where the ridges are present than a thickness $H_{Fa}$ of the flange-like rim at a location adjacent thereto. This embodiment may prove useful when a height $H_R$ of the ridges would otherwise become so large that the ridges might become unstable.

Figure 6B:
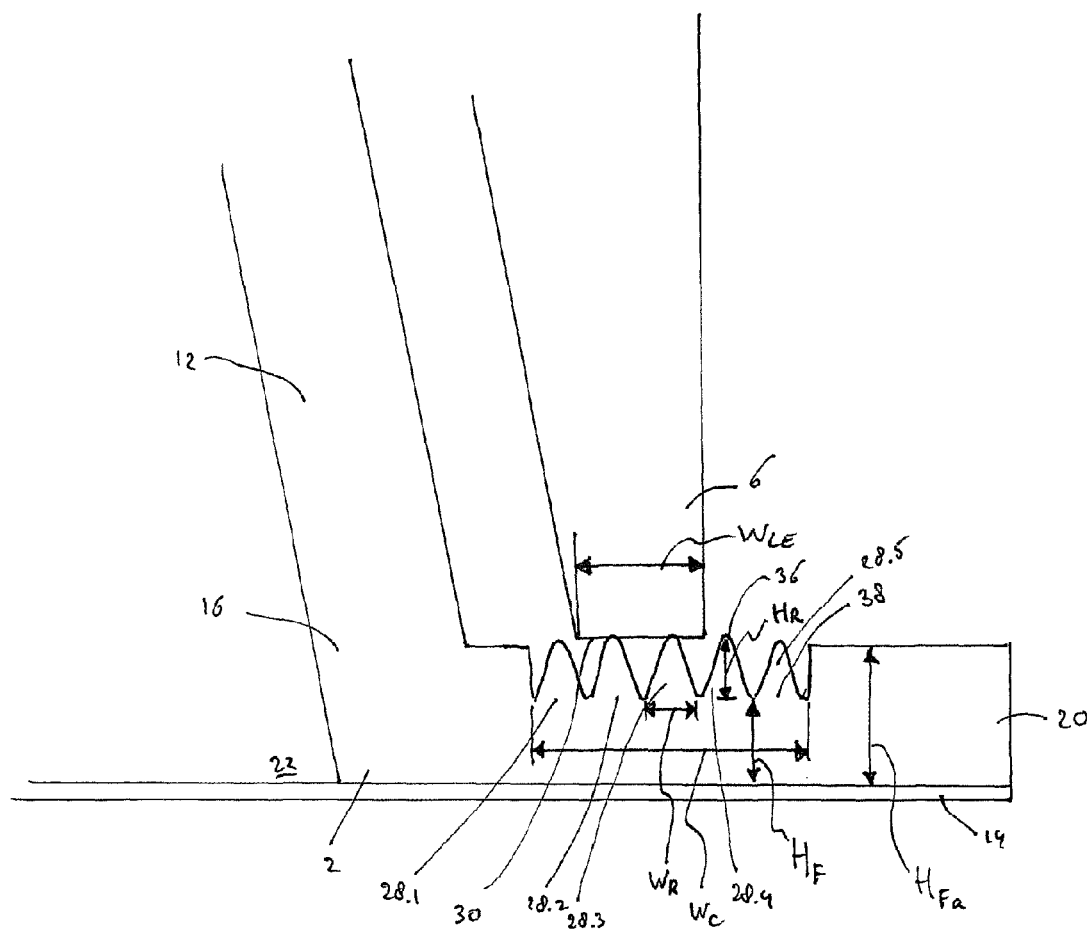
FIG. 6B shows a schematic representation of an even further example of a system according to the invention.

FIG. 6b shows a schematic representation of a further example of a system 1 according to the invention. The system 1 shown in FIG. 6b is substantially identical to the system shown in FIG. 3a and FIG. 3b. In FIG. 6b, however, the flange-like rim comprises a thinned portion at the location where the ridges 28.i are present. That is a thickness $H_F$ of the flange-like rim is smaller at the location where the ridges are present than a thickness $H_{Fa}$ of the flange-like rim at a location adjacent thereto. This embodiment may prove useful when a height $H_R$ of the ridges would otherwise become to small to be properly deformed.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the capsule as shown in FIG. 2 is used in the system of FIG. 1. It is possible that in such instance the capsule is designed such that the bottom is not pierced by the bottom piercing means. It is also possible that the lid and the lid piercing means are designed such that the lid is not torn under the effect of fluid pressure in the inner space of the capsule.

It will be appreciated that if the enclosing member has the leading edge for abutting the flange-like rim of the capsule, this leading edge may also comprise irregularities in the form of a plurality of radially extending grooves. Also in such case a sealing engagement may be obtained between the leading edge of the enclosing member and the ridges of the capsule according to the invention.

It is possible that the capsule is provided as a fillable or refillable capsule that can be filled or refilled by a user, respectively. Such capsule may be provided as a separate cup and lid that may be connected to the cup by the user after filling the capsule with a beverage ingredient. Alternatively, the lid may be partially, e.g. hingedly, connected to the cup so the user can connect the lid to substantially the entire perimeter of the flange-like rim after filling the cup with the beverage ingredient.

In the examples, the plurality of ridges comprises three or four ridges. It will be appreciated that also another number of ridges may be used, such as two, five, six, seven, eight, nine or ten ridges.

In the examples the capsules are substantially rotation symmetric about a central axis. It will be appreciated that the capsule may also have different shapes. In the examples, the ridges are substantially circular about the central axis. It will be appreciated that the ridges also may have other shapes.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A capsule for preparing a predetermined quantity of beverage suitable for consumption using an extractable product, the capsule comprising:
   a cup comprising a circumferential wall, a bottom closing the circumferential wall at a first end, and a flange-like rim extending outwardly of the circumferential wall at a second end opposite the bottom, and
   a lid in use connected to the flange-like rim,
   wherein the wall, bottom, and lid, in use, enclose an inner space comprising the extractable product, and
   wherein the cup further comprises a plurality of substantially concentric circumferential ridges extending outwardly of the cup, wherein the ridges are made of the same material as the cup, and wherein the ridges are arranged on the side of the flange-like rim facing away from the lid.

2. The capsule according to claim 1, wherein the ridges are integral with the flange-like rim.

3. The capsule according to claim 1, wherein each ridge of the plurality of ridges has substantially the same height.

4. The capsule according to claim 1, wherein each ridge of the plurality of ridges has substantially the same width.

5. The capsule according to claim 1, wherein a width of at least one ridge of the plurality of ridges is smaller than a height of that ridge.

6. The capsule according to claim 1, wherein at least one ridge of the plurality of ridges has a width that is equal to or less than a thickness of the flange-like rim.

7. The capsule according to claim 1, wherein at least one ridge of the plurality of ridges has a height that is equal to or less than a thickness of the flange-like rim.

8. The capsule according to claim 1, wherein the thickness of the flange-like rim is greater at the location where the ridges are present than at a location adjacent thereto.

9. The capsule according to claim 1, wherein the thickness of the flange-like rim is smaller at the location where the ridges are present than at a location adjacent thereto.

10. The capsule according to claim 1, wherein each ridge of the plurality of ridges has substantially the same cross sectional shape.

11. The capsule according to claim 1, wherein at least one ridge of the plurality of ridges has a tapered, substantially triangular, cross section.

12. The capsule according to claim 1, wherein a radial distance between two neighbouring ridges is less than a maximum width of the ridges, preferably less than 50% of the maximum width, more preferably less than 25% of the maximum width.

13. The capsule according to claim 1, wherein the plurality of ridges comprises two, three, four, five, six, seven or eight ridges.

14. The capsule according to claim 1, wherein a ridge of the plurality of ridges has a height of less than 0.4 mm, preferably less than 0.3 mm, more preferably less than 0.21 mm, even more preferably less than 0.15 mm.

15. The capsule according to claim 1, wherein a ridge of the plurality of ridges has a maximum width of less than 0.3 mm, preferably less than 0.21 mm, more preferably less than 0.15 mm.

16. The capsule according to claim 1, wherein the ridges are made from a plastic material.

17. The capsule according to claim 1, wherein the ridges are plastically deformable.

18. The capsule according to claim 1, wherein the capsule comprises a further ridge which is substantially concentric with the plurality of ridges, wherein a height of the further ridge is different from the height of the ridges.

19. The capsule according to claim 18, wherein the height of the further ridge is larger than the height of the ridges.

20. The capsule according to claim 18, wherein the further ridge comprises a conical section on an inner circumferential surface thereof.

21. The capsule according to claim 1, wherein the lid is connected to the flange-like rim and the inner space is at least partially filled with the extractable product.

22. The capsule according to claim 1, wherein the lid and/or bottom is porous and/or comprises openings for allowing a liquid to enter and/or exit the inner space.

23. The capsule according to claim 1, wherein the capsule is disposable and/or biodegradable.

24. A capsule and beverage brewing device for preparing a predetermined quantity of beverage suitable for consumption using an extractable product, the capsule and beverage brewing device comprising:
   a capsule comprising:
      a cup comprising a circumferential wall, a bottom closing the circumferential wall at a first end, and a flange-like rim extending outwardly of the circumferential wall at a second end opposite the bottom, and
      a lid in use connected to the flange-like rim,
      wherein the wall, bottom and lid, in use, enclose an inner space comprising the extractable product, and
      wherein the cup further comprises a plurality of substantially concentric circumferential ridges extending outwardly of the cup, wherein the ridges are made of the same material as the cup; and
   a beverage brewing device comprising an enclosing member for enclosing the capsule,
   wherein, in use, at least one of the ridges abuts against at least a portion of the enclosing member, such that a sealing engagement between the capsule and the enclosing member is formed; and wherein the ridges are arranged on the side of the flange-like rim of the capsule facing away from the lid.

25. The capsule and beverage brewing device according to claim 24, wherein the ridges are integral with the flange-like rim.

26. The capsule and beverage brewing device according to claim 24, wherein at least a portion of a leading edge of the enclosing member is arranged to abut against at least one of the ridges.

27. The capsule and beverage brewing device according to claim 24, wherein each ridge of the plurality of ridges has substantially the same height.

28. The capsule and beverage brewing device according to claim 24, wherein each ridge of the plurality of ridges has substantially the same width.

29. The capsule and beverage brewing device according to claim 24, wherein the ridges each have an individual width that is less than the width of the leading edge of the enclosing member.

30. The capsule and beverage brewing device according to claim 24, wherein the plurality of ridges has a combined width that is larger than the width of the leading edge of the enclosing member.

31. The capsule and beverage brewing device according to claim 24, wherein a width of a ridge of the plurality of ridges is smaller than a height of that ridge.

32. The capsule and beverage brewing device according to claim 24, wherein a at least one ridge of the plurality of ridges has a width that is equal to or less than a thickness of the flange-like rim.

33. The capsule and beverage brewing device according to claim 24, wherein at least one ridge of the plurality of ridges has a height that is less than the width of the leading edge of the enclosing member.

34. The capsule and beverage brewing device according to claim 24, wherein at least one ridge of the plurality of ridges has a height that is equal to or less than a thickness of the flange-like rim.

35. The capsule and beverage brewing device according to claim 24, wherein the thickness of the flange-like rim is greater at the location where the ridges are present than at a location adjacent thereto.

36. The capsule and beverage brewing device according to claim 24, wherein the thickness of the flange-like rim is smaller at the location where the ridges are present than at a location adjacent thereto.

37. The capsule and beverage brewing device according to claim 24, wherein a ridge of the plurality of ridges has a tapered, substantially triangular, cross section.

38. The capsule and beverage brewing device according to claim 24, wherein a radial distance between two neighbouring ridges is less than a maximum width of the ridges, preferably less than 50% of the maximum width, more preferably less than 25% of the maximum width.

39. The capsule and beverage brewing device according to claim 24, wherein the plurality of ridges comprises two, three, four, five, six, seven or eight ridges.

40. The capsule and beverage brewing device according to claim 24, wherein a ridge of the plurality of ridges has a height of less than 0.4 mm, preferably less than 0.3 mm, more preferably less than 0.21 mm, even more preferably less than 0.15 mm.

41. The capsule and beverage brewing device according to claim 24, wherein a ridge of the plurality of ridges has a maximum width of less than 0.3 mm, preferably less than 0.21 mm, more preferably less than 0.15 mm.

42. The capsule and beverage brewing device according to claim 24, wherein the ridges are made from a plastics material.

43. The capsule and beverage brewing device according to claim 24, wherein the capsule comprises a further ridge which is substantially concentric with the plurality of ridges, wherein a height of the further ridge is different from the height of the ridges.

44. The capsule and beverage brewing device according to claim 43, wherein the height of the further ridge is larger than the height of the plurality of ridges.

45. The capsule and beverage brewing device according to claim 43, wherein the further ridge is arranged to abut against an outer circumferential surface of the enclosing member.

46. The capsule and beverage brewing device according to claim 43, wherein the further ridge comprises a conical section on an inner circumferential surface thereof.

47. The capsule and beverage brewing device according to claim 24, wherein the lid is connected to the flange-like rim and the inner space is at least partially filled with the extractable product.

48. The capsule and beverage brewing device according to claim 24, wherein the capsule is hermetically closed.

49. The capsule and beverage brewing device according to claim 24, wherein the lid and/or bottom is porous and/or comprises openings for allowing a liquid to enter and/or exit the inner space.

50. The capsule and beverage brewing device according to claim 47, wherein the capsule is enclosed in the enclosing member such that the at least one of the ridges abuts against at least the portion of the enclosing member, such that a sealing engagement between the capsule and the enclosing member is formed.

51. The capsule and beverage brewing device according to claim 50, wherein the at least one ridge is plastically deformed by the enclosing member.

52. The capsule and beverage brewing device according to claim 24, wherein the capsule is disposable and/or biodegradable.

* * * * *